US005087286A

United States Patent [19]

Fukuda et al.

[11] Patent Number: 5,087,286

[45] Date of Patent: Feb. 11, 1992

[54] HEAT-CURABLE RESINOUS COATING COMPOSITION

[75] Inventors: Mitsuhiro Fukuda; Hirotoshi Inoue; Akira Kasari; Yuzo Miyamoto; Osamu Isozaki; Noboru Nakai, all of Hiratsuka, Japan

[73] Assignee: Kansai Paint Co., Ltd., Hyogo, Japan

[21] Appl. No.: 496,201

[22] Filed: Mar. 19, 1990

[30] Foreign Application Priority Data

| | | | |
|---|---|---|---|
| Mar. 20, 1989 | [JP] | Japan | 1-68863 |
| Oct. 11, 1989 | [JP] | Japan | 1-264675 |
| Oct. 11, 1989 | [JP] | Japan | 1-264676 |

[51] Int. Cl.[5] ........ C09K 135/00

[52] U.S. Cl. ........ 106/287.16; 525/440

[58] Field of Search ........ 525/440, 438; 106/287.16

[56] References Cited

U.S. PATENT DOCUMENTS

| | | | |
|---|---|---|---|
| 3,907,737 | 9/1975 | Marx et al. | 260/29.6 NR |
| 4,303,563 | 12/1981 | Emmons et al. | 260/23 AR |
| 4,390,688 | 6/1983 | Walz et al. | 528/295.3 |
| 4,430,486 | 2/1984 | Chang et al. | 525/44 |
| 4,486,555 | 12/1984 | Kordomenos et al. | 523/400 |
| 4,525,499 | 6/1985 | Hayashi et al. | 523/523 |
| 4,551,491 | 11/1985 | Panush | 524/31 |

FOREIGN PATENT DOCUMENTS

| | | |
|---|---|---|
| 3201749 | 8/1982 | Fed. Rep. of Germany . |
| 3312814 | 10/1984 | Fed. Rep. of Germany . |
| 3537855 | 5/1987 | Fed. Rep. of Germany . |
| 2423886 | 1/1975 | German Democratic Rep. . |

*Primary Examiner*—Mark L. Bell
*Assistant Examiner*—Alan Wright
*Attorney, Agent, or Firm*—Wenderoth, Lind & Ponack

[57] ABSTRACT

A heat-curable resinous coating composition comprising as a binder component (A) 5 to 90% by weight of a hydroxyl-containing resin selected from hydroxyl-containing acrylic resins and hydroxyl-containing polyester resins, (B) 5 to 50% by weight of an amino resin, and (C) 1 to 90% by weight of a crosslinkable resin selected from (C-a) polyfunctional resins having a number average molecular weight of at least 1000 and containing at least two carboxyl groups and at least two epoxy groups on an average per molecule and (C-b) polyorganosiloxanes having a number average molecular weight of at least 500 and containing at least two silanol groups on an average per molecule and if required, further containing an epoxy group.

15 Claims, No Drawings

HEAT-CURABLE RESINOUS COATING COMPOSITION

This invention relates to a heat-curable resinous coating composition. More specifically, it relates to a heat-curable resinous coating composition suitable as a top coat capable of forming a coated film having excellent acid resistance and scratching resistance Metallic materials are often coated with films for imparting corrosion resistance and aesthetic property.

Atmospheric pollution increased in recent years, and damages of forests, such as withering, by acidic rains have raised a serious social problem. Coated films applied to articles to be used outdoors, for example an automobile outer plate may undergo damages, for example by etching with acidic rain or whitening or bloom damage Hence there is a very strong requirement for providing coated films having excellent acid resistance.

Furthermore, coated films, for example, on an automobile outer plate, are susceptible to scratch owing to collision with sands and dusts during driving, friction by washing brushes, and this is one cause of the reduction of the appearance of the coated film. Occurrence of scratches in films of dark colors such as black, deep blue and brown is particularly marked. There is a very strong requirement for improving the scratch resistance of top coat film.

Nowadays, a paint having a hydroxyl group-containing resin and an amino resin as a binder is generally used as a thermosetting topcoating paint. But no coating composition simultaneously satisfying acid resistance and a scratch resistance has not been obtained.

In order to provide a coating composition having strikingly improved acid resistance and scratch resistance without impairing the weatherability, solvent resistance, water resistance, mechanical properties and appearance of a coated film, the present inventors studied the glass transition point, molecular weight and composition of a hydroxyl-containing resin in a coating composition comprising a combination of the hydroxyl-containing resin and an amino resin. As a result, the present inventors found that by adjusting these properties of the hydroxyl-containing resin, a coating composition can be obtained which forms a coated film having acid resistance and scratch resistance to some extent, but this improvement is not yet on a satisfactory level.

Further studies of the present inventors have now led to the discovery that the use of a polymer blend comprising not only a combination of a hydroxyl-containing resin and an amino resin and further a certain polymer having a crosslinkable functional group gives a coating composition capable of forming a coated film having greatly improved acid resistance and scratch resistance and without substantially impairing the appearance and other properties of a coated film.

Thus, according to this invention, there is provided a heat-curable resinous coating composition comprising as a binder component (A) 5 to 90% by weight of a hydroxyl-containing resin selected from hydroxyl-containing acrylic resins and hydroxyl-containing polyester resins, (B) 5 to 50% by weight of an amino resin, and (C) 1 to 90% by weight of a crosslinkable resin selected from polyfunctional resins having a number average molecular weight of at least 1000 and containing at least two carboxyl groups and at least two epoxy groups on an average per molecule and polyorganosiloxanes having a number average molecular weight of at least 500 and containing at least two silanol groups on an average per molecule and optionally further containing an epoxy group.

Throughout the present specification and claims, the amounts in % by weight of components (A), (B) and (C) are based on the total weight of the three components unless otherwise specified.

The coating composition to be provided by this invention will be described in more detail hereinbelow.

Hydroxyl-Containing Resin

The hydroxyl-containing resin (A) used in this invention includes hydroxyl-containing acrylic resins and hydroxyl-containing polyester resins usually used in the field of thermosetting resin coating compositions, particularly as top coating paints.

The hydroxyl-containing acrylic resin includes, for example, copolymers of hydroxyl-containing acrylic monomers and other vinyl monomers copolymerizable therewith. Examples of the hydroxyl-containing acrylic monomers include $C_2$–$C_{24}$ hydroxyalkyl acrylates or methacrylates such as 2-hydroxyethyl methacrylate, hydroxypropyl acrylate, hydroxypropyl methacrylate, hydroxybutyl acrylate and hydroxybutyl methacrylate; and mono- or di($C_1$–$C_{12}$ hydroxyalkyl)amides such as N-methylol acrylamide, N-methylol methacrylamide, N-hydroxyethylacrylamide, N-hydroxyethyl methacrylamide, N,N-dihydroxyethyl acrylamide, and N,N-dihydroxyethyl methacrylamide.

Examples of the vinyl monomers copolymerizable with these hydroxyl-containing acrylic monomers include $C_1$–$C_{24}$ alkyl acrylates or methacrylates such as methyl acrylate, ethyl acrylate, propyl acrylate, n-butyl acrylarte, isobutyl acrylate, pentyl acrylate, hexyl acrylate, n-octyl acrylate, nonyl acrylate, lauryl acrylate, 2-ethylhexyl acrylate, 2-ethylbutyl acrylate, methyl methacrylate, ethyl methacrylate, propyl methacrylate, n-butyl methacrylate, iso-butylmethacrylate, pentyl methacrylate, hexyl methacrylate, 2-ethylhexyl methacrylate, decyl methacrylate, lauryl methacrylate and stearyl methacrylate; acrylnitrile and methacrylonitrile; carboxyl-containing vinyl monomers such as acrylic acid, methacrylic acid and crotonic acid; vinyl aromatic-compounds such as styrene, alpha-methylstyrene, vinyl-toluene and p-chlorostyrene; polyolefin compounds such as butadiene, isoprene and chloroprene; vinyl esters such as vinyl acetate, Veova monomer (a product of Shell Chemical Co.), vinylpropionate and vinyl pivalate: and epoxy-containing vinyl monomers such as glycidyl acrylate, glycidyl methacrylate and allyl glycidyl ether. They may be used singly or in combination according to the properties required of the resulting copolymers.

Copolymerization of these monomers may be carried out, for example, by a solution polymerization method, a suspension polymerization method or an emulsion polymerization method. The resulting copolymer may be in any desired form, such as a solution in an organic solvent or in a non-aqueous dispersion. The proportion of the hydroxyl-containing acrylic monomer to be used depends upon the hydroxyl value of the hydroxyl-containing resin. Generally, it is 4 to 55% by weight, preferably 6 to 40% by weight, more preferably 10 to 35% by weight, based on the entire monomers used for the production of the copolymer.

The hydroxyl-containing acrylic resin prepared as above may have a number average molecular weight of generally 1,000 to 50,000, preferably 2,000 to 30,000, more preferably 3,000 to 10,000.

The hydroxyl-containing polyester resins may include oil-free polyester resins (or alkyd resins) normally used in the field of paints. They may be produced by polycondensing at least one polybasic acid component selected from phthalic acid and anhydrides thereof, isophthalic acid, isophtalic acid, terephthalic acid, trimellitic acid and anhydrides thereof, hexahydrophthalic acid and its anhydride thereof, succinic acid, adipic acid, pimelic acid, sebacic acid, and brassylic acid and at least one polyol component selected from ethylene glycol, diethylene glycol, propylene glycol, neopentyl glycol, 1,6-hexane diol, trimethylolpropane, glycerol, pentaerythththritol and tricyclodecane dimethanol in a customary manner under such conditions that the amount of the hydroxyl groups is more than one equivalent per equivalent of the acid groups.

In the polycondensation reaction, the molecular weight of the polymer to be prepared may be controlled by using an reaction control agent such as benzoic acid or p-t-butylbenzoic acid. Alternatively, oil-modified polyester resins may be produced by blending an oil or a fat with the acid component and the polyol component or using a fatty acid such as coconut oil fatty acid, tall oil fatty acid or castor oil fatty acid as part of the acid component. The polyester resin may be modified by chain-extending it with an aliphatic polyisocyanate such as 1,6-hexamethylene diisocyanate or epsilon caprolactam.

Desirably, the hydroxyl-containing polyester resins described above have a number average molecular weight of generally 800 to 50,000, preferably 1,000 to 30,000, more preferably 2,000 to 20,000.

The hydroxyl-containing resin (A) selected from the hydroxyl-containing acrylic resins and the hydroxyl-containing polyester resins may be used singly or in a combination of two or more. From the viewpoint of weatherability, it is preferred to use the hydroxyl-containing acrylic resin, particularly that which contains at least 40% by weight of a $C_1$-$C_{12}$ alkyl acrylate or methacrylate in the constituent monomers. The amount of the hydroxyl groups of these resins (A), in terms of the hydroxyl value, in generally 20 to 200, preferably 30 to 150, more preferably 50 to 130. When the above resins contain an acidic group, these resins conveniently have usually not more than 50, preferably 5 to 30, more preferably 5 to 20.

Amino Resin (B)

The amino resin used in this invention reacts under heat with the hydroxyl groups of the hydroxyl-containing resin to form a crosslinkage, and has per molecule at least two, preferably at least three, groups which react with the hydroxyl groups, Methylolated amino resins obtained by reacting amino-containing compounds such as melamine, urea, benzoguanamine, acetoguanamine, steroguanamine, spiroguanamine or dicyanediamide with aldehydes in a customary manner or those which are obtained by etherification of the methylolated amino resin with suitable alcohols may be used as the amino resin. The aldehydes which may be reacted with the amino-containing compounds may include formaldehyde, p-formaldehyde, acetaldehyde and benzaldehyde. Examples of the alcohol used to etherify the methylolated amino resins include methanol, ethanol, n-propanol, i-propanol, n-butanol, i-butanol, 2-ethylbutanol and 2-ethylhexanol.

In view of scratch resistance, preferred amino resins are etherified melamine resins, particularly highly etherified malamine resins having a high degree of etherification, for example, having on average, three or more, preferably 4 to 6, methyl etherified groups per triazine ring, which have an average degree of condensation not more than about 2, and which are of low molecular weight with the proportion of a mononuclear compound being at least about 50% by weight, or melamine resins resulting from substitution of some of the methyl etherified groups by alcohols having at least two, preferably 2 to 4, carbon atoms. When the etherified melamine resin is to be used, it is preferable to use a customary curing catalyst such as p-toluenesulfonic acid in combination.

Cosslinkable Resin (C)

The crosslinkable resin (C) in this invention may be selected from (C-1) polyfunctional resins having at lease two carboxyl groups and at least two epoxy groups on an average per molecule and having a number average molecular weight, and (C-2) polyorganosiloxanes having a number average molecular weight of at least 500 and containing at least two silanol groups on an average per molecule and if required, an epoxy group.

The base resins constituting polyfunctional resins (C-1) may be selected from a broad range of base resins such as vinyl copolymers, polyesters, polyurethanes and polyether polymers. Of these, the vinyl copolymers are preferable in view of their storage stability.

The vinyl copolymers containing at least two carboxyl groups and at least two epoxy resin on an average per molecule may be produced by copolymerizing a carboxyl-containing vinyl monomer and an epoxy-containing vinyl monomer, if required together with another copolymerizable vinyl monomer.

Examples of the carboxyl-containing vinyl monomer that can be used in this invention are preferably acrylic acid and methacrylic acid, but are not limited to it. There can also be used, for example, maleic acid, itaconic acid, crotonic acid, and an adduct of acrylic or methacrylic acid with epsilon-caprolactone.

Examples of the vinyl monomer containing an epoxy group which can be copolymerized with the carboxyl-containing vinyl monomer are glycidyl acrylate, glycidyl methacrylate, allyl glycidyl ether, and alicyclic ooxirane group-containing vinyl monomers represented by the following formulae (1) to (14).

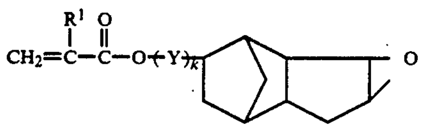

(1)

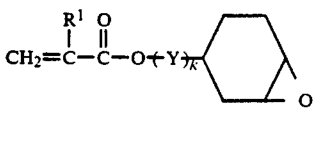

(2)

-continued

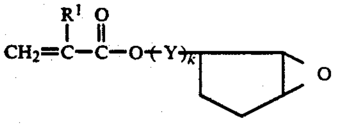

(3)

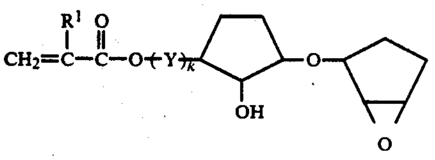

(4)

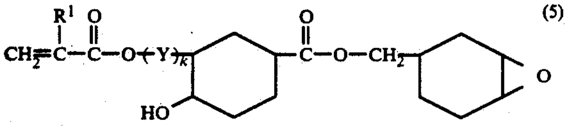

(5)

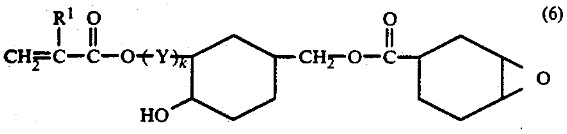

(6)

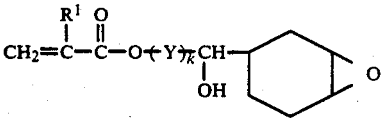

(7)

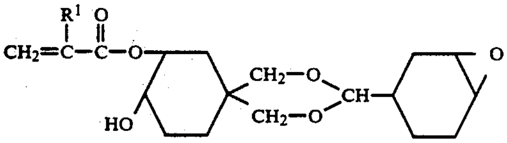

(8)

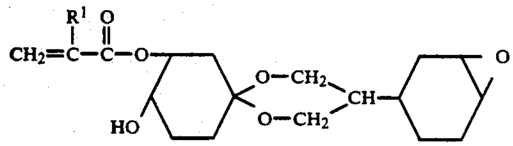

(9)

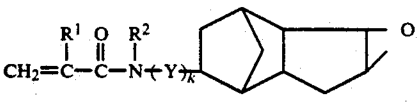

(10)

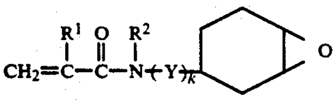

(11)

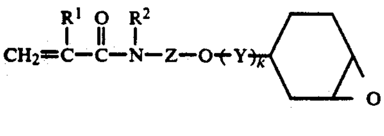

(12)

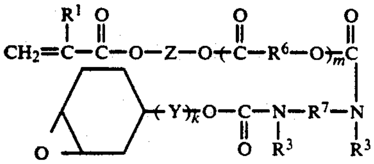

(13)

-continued

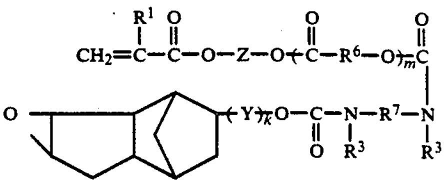

(14)

In these general formulae, $R^1$, $R^2$ and $R^3$ may be identical or different, ane each represents a hydrogen atom or a methyl group; Y and Z are a divalent group of the formula

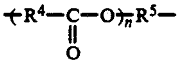

in which $R^4$ represents a divalent aliphatic saturated hydrocarbon group having 1 to 10 carbon atoms, and $R^5$ represents a divalent aliphatic saturated hydrocarbon group having 1 to 6 carbon atoms and n is an integer of 0 to 10 carbon atoms; $R^6$ and $R^7$ are identical or different and each represents a divalent aliphatic saturated hydrocarbon group having 1 to 10 carbon atoms; k is 0 or 1; and m is an integer of 0 to 10.

The "aliphatic saturated hydrocarbon group" may be linear or branched. Specific examples of $R^5$ are methylene, ethylene, propylene, isopropylene, butylene, 2-methylpropylene, 2,2-dimethylpropylene and hexylene. Specific examples of $R^4$, $R^6$ and $R^7$ are 2-ethtylhexylene in addition to the groups exemplified for $R^5$.

Among the monomers of the alicyclic oxirane-containing vinyl monomers of general formula (2) which are easy to produce industrially, especially 3,4-epoxycyclohexyl methyl acrylate and 3,4-epoxycyclohexyl methyl methacrylate, are preferred.

The other copolymerizable vinyl monomer which may be used, as required, with the carboxyl-containing vinyl monomer or the epoxy-containing monomer may be selected widely according to the properties desired of the resulting copolymers. Typical examples are selected from the following.

(a) Acrylic acid or methacrylic acid esters

For example, $C_1$-$C_{18}$ alkyl acrylates or methacrylates such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$-$C_{18}$ alkoxyalkyl acrylate or methacrylate such as methoxyethyl acrylate, methoxybutyl acrylate, ethoxybutylacrylte, methoxyethyl methacrylate, methoxybutyl methacrylate and ethoxybutyl methacrylate; $C_2$-$C_8$ alkenyl acrylates or methacrylates such as allyl acrylate or allyl methacrylate; $C_2$-$C_8$ hydroxyalkyl acrylates or methacrylates such as hydroxyethyl acrylate, hydroxyethyl methacrylate, hydroxypropylacrylate and hydroxypropyl methacrylate; and. $C_3$-$C_{18}$ alkenyloxy alkyl acrylates or methacrylates such as allyloxyethyl acrylate and allyoxyethyl methacrylate.

(b) Vinyl aromatic compounds such as styrene, alphamethylstyrene, vinyltoluene and p-chlorostyrene.

(c) Polyolefin compounds such as butadiene, isoprene and chloroprene.

(d) Other vinyl monomers, such as acrylonitrile, methacrylonitrile, methyl isopropenyl ketone, vinyl acetate, Veova monomer (a product of Shell Chemical Co.), vinyl pivalate, allyl alcohol, vinyl compounds having a polycaprolactone chain (such as "FM-3X", a product of Daicell Chemical Industryl Co., Ltd.), acrylamide, methacrylamide, N-methtylolacrylamide butyl ether and N-methylol methacrylamide butyl ether.

The copolymerization of the vinyl monomers described above may be carried out as in the known copolymerization method, for example, by dissolving or dispersing the monomer components in a suitable organic solvent, such as alcohols, ethers, esters, or hydrocarbons and heating the solution or dispersion in the presence of a radical polymerization initiator such as benzoyl peroxide, N-butylperoxy-2-ethylhexanoate, 2,2'-azobisisobutyronitrile and azobisdimethylvaleronitrile to a temperature of, usually, about 40° to about 100° C., preferably about 60° to 80° C.

The polyfunctional resin (C-1) containing carboxyl groups and epoxy groups may have a number average molecular weight of at least 1,000, usually 2,000 to 100,000, preferably 3,000 to 30,000, more preferably 5,000 to 10,000. The polyfunctional resin has at least 2, preferably 2 to 30, more preferably 5 to 10, carboxyl groups, on an average per molecule, and at least 2 epoxy groups, preferably 2 to 30 epoxy groups, more preferably to 10 epoxy groups, on an average per molecule.

As the crosslinkable resin (C), there can be used polyorganosiloxanes having at least 2, preferably 2 to 30, more preferably 2 to 10 silanol groups on an average per molecule, and if required, 1, preferably 1 to 30, and more preferably 1 to 10, epoxy groups, on an average per molecule.

The organopolysiloxanes preferably contain a ladder structural portion and may be produced by, for example, hydrolyzing and (co)condensing a silane represented by the following formula (II)

$$R_x^2Si(OR^3)_{4-x} \quad (II)$$

wherein $R^2$ and $R^3$ are identical or different and each represents a monovalent hydrocarbon groups having 1 to 13 carbon atoms, optionally together with an epoxy-containing silane compound of the following general formula

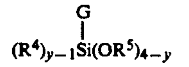

(III)

wherein $R^4$ and $R^5$ are same or different and each represents a monovalent hydrocarbon having 1 to 13 carbon atoms, y represents 1, 2 or 3, and G is an epoxy group-containing organic group, such as (IV) or (V)

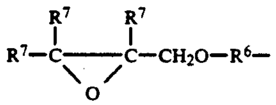

(IV)

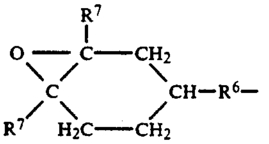

(V)

wherein $R^6$ represents a divalent hydrocarbon group having 1 to 13 carbon atoms, and each of two-or more $R^7$ is same or different and represents a hydrogen atom or a methyl group.

In the above formulae, the "monovalent hydrocarbon group" include linear, branched or cyclic aliphatic hydrocarbon, for example, alkyl groups such as methyl, ethyl, n- or iso-propyl, n-, iso- sec- or tertbutyl or n-hexyl; aromatic hydrocarbon groups such as a phenyl or tolyl group and an araliphatic hydrocarbon such as a benzyl or phenethyl groups. The "divalent hydrocarbon group" may include linear, branched or cyclic divalent aliphatic hydrocarbon groups such -as alkylene groups-e.g., methylene, ethylene, n-propylene, 1-methylethylene, n-butylene, 1,1-dimethylethylene, 1,2-dimethylethylene, 1-methyl-propylene, n-hexylene and 2-ethylhexylene; and divalent aromatic hydrocarbon groups such as o-, m- or p-phenylene, 3-methyl-1,4-phenylene, 4- or 5-methyl-1,3-phenylene, 3- or 4-methyl-1,2-phenylene; and divalent araliphatic hydrocarbons such as a benzylene or phenethylene.

Typical examples of the silane of formula (II) include methyltrimethoxysilane, methyltriethoxysilane, phenyltrimethoxysilane, phenyltriethoxysilane, isobutyltrimethoxysilane, isobutyltriethoxysilane, ethyltrimethoxysilane, isobutyltrimethoxysilane, isobutyltriethoxysilane, ethyltrimethoxysilane, dimethoxyldimethoxysilane, ethyltrimethoxysilane, dimethyldimethoxysilane, dipheyldimethoxysilane, diphenyldiethoxysilane, diisobutyldimethoxysilane, diisobutyldipropoxysilane and trimethylmethoxysilane.

Typical examples of the silane of formula (III) include gamma-glycidoxypropyltrimethoxysilane, gamma-glycidoxypropyltriethoxysilane, beta-(3,4-epoxycyclohexyl)ethyltrimethoxysilane, and beta-(3,4-epoxycyclohexyl)ethyltriethoxysilane. The organopolysiloxane used as the crosslinkable resin (C) may be obtained by hydrolyzing and condensing only silane of formula (II), in which case the silane of formula (II) in which x is 1 is an essential component. Conveniently, the above component is hydrolyzed and condensed singly, or together with a silane of formula (II) in which x is 2 or 3 is used together. The desirable amount of the silane in which x is 1 is at least 5% by weight, preferably at least 30% by weight, and more preferably in an amount of at least 40% by weight, based on the total amount of the silanes.

As the crosslinkable resin (C), a product obtained by hydrolyzing and co-condensing the silane of formula (II) and the epoxy-containing silane of formula (III) may be used. The proportion of the silane of formula (II) and the epoxy-containing silane of formula (III) to be used are not strictly limited, and may vary over a wide range. Generally, the weight ratio of the silane of formula (II)/the epoxy-containing silane of formula (III) is at least 10/90, preferably 10/90 to 95/5, more preferably 20/80 to 80/20. Each of the silane of formula (II) and the epoxy-containing silane of formula (III) may be singly used. Or each may be a mixture of two or more which may have different x or y values. In any case, it is convenient that the total amount of the silane of formula (II) in which x=1 and the epoxy-containing silane of formula (III) in which y=1 is at least 5% by weight, preferably at least 30% by weight, and more preferably at least 40% by weight.

The hydrolysis (co)condensation of the silane compounds can be carried out in accordance with known methods of synthesizing polyorganosiloxanes. For example, the silane compounds, as required, are mixed with a water-miscible solvent such as an alcohol or an ethylene glycol monoalkyl ether, and the solution is stirred at about 20° to about 100° C. for about 30 minutes to about 20 hours under acidic conditions, preferably not more than about 6, usually at a pH of 6 to 2, in the presence of water and a acid such as mineral acid, e.g., hydrochloric acid, sulfuric acid or phosphoric acid; or an organic acid, e.g., formic acid or acetic acid.

The molecular weight of the resulting polyorganosiloxane can be adjusted by properly changing the amount of water used, the type or amount of the acid catalyst, the reaction temperature, and the reaction time. The polyorganosiloxane used in this invention may gave a number average molecular weight of at least 500, preferably 1,000 to 10,000, more preferably 1,000 to 3,000.

Preferred examples of the crosslinking resin (C) are copolymers having (meth)acrylic acid, 2,4-epoxycyclohexylmethyl and $C_1$–$C_{18}$ alkyl (meth)acrylates as main monomer components and polyorganosiloxanes containing at least one of methyltrimethoxysilane and phenyl trimethoxysilane as a condensing component.

Resinous Coating Composition

The coating composition of this invention comprises (A) the hydroxyl-containing resin, (B) the amino resin, and (C) the crosslinkable resin as a binder component in the proportions indicated below.

| | Blending proportions (% by weight) | | |
|---|---|---|---|
| | General range | Preferred range | More preferred range |
| (A) | 5 to 90 | 10 to 60 | 30 to 60 |
| (B) | 5 to 50 | 10 to 45 | 10 to 40 |
| (C) | 1 to 90 | 10 to 50 | 20 to 40 |

As required, the coating composition of this invention may contain ordinary paint additives such as organic solvents, pigments, ultraviolet absorbers, paint surface adjusting agents, curing catalysts and a pigment dispersants, in addition to the three binder components (A), (B) and (C).

Examples of organic solvents that can be incorporated into the coating composition of this invention include aromatic hydrocarbons such as xylene and toluene, esters such as ethyl acetate, propyl acetate and butyl acetate, ketones such as acetone and methyl ethyl ketone, and ethers such as ethylene glycol, Cellosolve, butyl Cellosolve and Cellosolve acetate. These organic solvents may be used singly or as a mixture of two more. From the standpoint of curability, those having a boiling point of less than about 150° C. are preferred, but not are limited:

Examples of pigments which may be included in the coating composition of this invention include organic pigments (for example, quinacridones of quinacridone red, azos of pigment red, and phthalocyanines of phthalocyanine blue a-nd phthalocyanine green), inorganic pigments (such as titanium oxide, red iron oxide, barium sulfate, calcium carbonate, baryta, clay and silica), carbonaceous pigments (such as carbon black), scaly metallic-powders (such as aluminum, micaceous iron oxide and stainless steel), and rust-proof pigments (such as zinc chromate and strontium chromate).

Examples of the ultraviolet absorbers include benzophenone compounds and benzotriazole compounds. Examples of the paint surface adjusting agents include acrylic oligomers and silicone additives. Examples of the curing catalysts include p-toluenesulfonic acid, dodecylbenzenesulfonic acid, dinonylnaphthalenedisufonic acid, dinonylnaphthalenesulfonic acid and the neutralization product of these acids with bases such as amines.

Utility

The resinous coating composition of this invention can form a coated film having outstandingly improved acid resistance and scratch resistance without substantially reducing the weatherability, solvent resistance, water resistance, mechanical properties and film properties and can be applied as a surface coating to substrates such as metals (such as a steel plate or a surface-treated steel plate) or a plastic substrate either directly to the surface of the substrate or through a primer or primer/intermediate coat on the substrate. It is particularly suited as a top coating of automobile parts.

When the coating composition of this invention is used as a top coating of automobiles, it can be used as a 2-coat 1-bake or 2-coat 2-bake top enamel coatings and a top coating clear paint, and also as a 1-coat 1-bake solid color paint.

The method of coating the coating composition of this invention as an automobile top coating is specifically described below.

For example, the coating composition of this invention is adjusted to a coating viscosity corresponding to Ford cup No. 4 of 11 to 30 seconds at 20° C. The solution is coated by a coating means such as electrostatic coating (bell-type, REA-type) or airless spray to a dry thickness of about 10 to 60 micrometers. The baking conditions may be a temperature of about 120° to 180° C. and a time of 10 to 30 minutes.

The coating composition of this invention contains as one binder component the crosslinkable resin (C) containing carboxyl groups and epoxy groups per molecule, or silanol groups or both a silanol group and an epoxy group per molecule. Thus upon heating, carboxyl groups with epoxy groups, silanol groups with each other, the silanol group with the epoxy group or these groups with the hydroxyl groups and/or carboxyl groups contained in the hydroxyl-containing resin (A) react to form a firm and dense crosslinked structure having excellent hydrolysis resistance. It is believed therefore that the acid resistance and scratch resistance of the film can be greatly improved, and the resulting film also has excellent water resistance and solvent resistance.

The following examples illustrate the present invention more specifically. All parts and percentages are by weight.

PRODUCTION EXAMPLE 1

A monomeric mixture composed of 30 parts of styrene, 40 parts of n-butyl methacrylate, 10 parts of 2-ethylhexyl acrylate, 18 parts of 2-hydroxyethyl acrylate and 2 parts of acrylic acid was reacted in an organic solvent mixture of 85 parts of xylene and 15 parts of n-butanol to give a hydroxyl-containing acrylic resin solution (A-1) having a number average molecular weight of 6,600, a resin solids of 50% and a Gardner viscosity (25° C.) of J.

PRODUCTION EXAMPLE 2

A monomeric mixture composed of 30 parts of styrene, 30 parts of n-butyl methacrylate, 15 parts of 2- ethylhexyl acrylate and 25 parts of 2-hydroxyethyl acrylate was reacted in an organic solvent mixture of 85 parts of xylene and 15 parts of n-butanol to give a hydroxyl-containing acrylic resin solution (A-2) having a number average molecular weight of 5,000, a resin solids of 50% and a Gardner viscosity (25° C.) of B.

PRODUCTION EXAMPLE 3

Isophthalic acid (0.29 mole), 0.23 mole of phthalic acid, 0.43 mole of hexahydrophthalic acid, 0.4 mole of trimethylolpropane, 0.6 mole of neopentyl glycol and 0.1 mole of coconut oil fatty acid were put into a reactor, and polycondensed at 200° to 230 ° to give a coconut oil-modified polyester resin having a number average molecular weight of about 5,000, an acid value of 8 and a hydroxyl value of 72. Xylene (43 parts) was added to 100 parts of the polyester resin to prepare a 60% by weight varnish (A-3) having a Gardner viscosity (25° C.) of Y .

PRODUCTION EXAMPLE 4

| | |
|---|---|
| Acrylic acid | 72 parts |
| A compound of the following formula | |
| 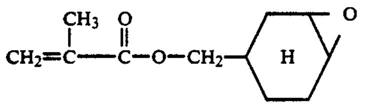 | 235 parts |
| n-butyl methacrylate | 693 parts |
| azobisdimethylvaleronitrile | 30 parts |

A four-necked flask was charged with 1,000 parts of xylene, and maintained at 80° C. A mixture of the above monomers and the polymerization initiator was added dropwise over 2 hours. After the addition, the mixture was aged at 80° C. for 3 hours to give a curable resin solution (C-a) having a solids content of 50% and a Gardner viscosity (25° C.) of P. The resulting resin had a number average molecular weight of 25,000. This resin contained about 1.1 moles/kg of epoxy groups and about 1.0 moles/kg of carboxyl groups.

PRODUCTION EXAMPLE 5

| | |
|---|---|
| Methacrylic acid | 172 parts |
| Compound having the formula | |
| 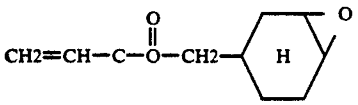 | 190 parts |
| Methyl methacrylate | 638 parts |
| Azobisdimethyl valeronitrile | 50 parts |

A four-necked flask was charged with 1,000 parts of xylene, and maintained at 80° C., and a mixture of the monomers and the polymerization initiator was added dropwise over 3 hours. After the addition, the mixture was aged for 2 hours at 80° C. to give a curable resin solution (C-b) having a solids content of 50% and a Gardner viscosity (25° C.)of D.

The resulting resin had a number average molecular weight of about 12,000. The resin contained about 1.0 mmole/kg of epoxy groups, and about 2.0 moles/kg of carboxyl groups.

PRODUCTION EXAMPLE 6

Phenyltrimethoxysilane (198 parts), 54 parts of deionized water and 98% sulfuric acid (0.002 part) were mixed, and reacted at 60° C. for 5 hours. Under reduced pressure-, methanol was removed, xylene was added to prepare a polyorganosiloxane-solution (C-c) having a solids content of 50% and Gardner viscosity (25° C.) of AB. The resulting polyorganosiloxane had a number average molecular weight of about 5,000 and contained 6 silanol groups on an average per molecule.

PRODUCTION EXAMPLE 7

Methyltrimethoxysilane (136 parts), 182 parts of diphenyldimethoxysilane, 90 parts of diionized water and 1 part of 60% phosphoric acid were mixed, and reacted at 60° C. for 10 hours. Methanol was removed under reduced pressure, and butyl acetate was added to form a polyorganosiloxane solution (C-d) having a solids content of 50% and a Gardner viscosity (25° C.) of D. The resulting polyorganosiloxane had a number average molecular weight of about 15,000 and contained 10 silanol groups on an average per molecule.

PRODUCTION EXAMPLE 8

Diphenyldimethoxysilane (182 parts), 186 parts of beta-(3,4-epoxycyclohexyl)ethyltrimethoxysilane, 108 parts of deionized water and 1 part of 60% phosphoric acid were mixed and reacted at 60° C. for 15 hours. Methanol was removed under reduced pressure and butyl acetate was added to give a polyorganosiloxane solution (C-e) having a solids content of 50% and a Gardner viscosity (25° C.) of G. The resulting polyorganosiloxane had a number average molecular weight of about 20,000 and contained 10 silanol groups and 7 epoxy groups on an average per molecule.

PRODUCTION EXAMPLE 9

Phenyltrimethoxysilane (198 parts), 236 parts of gamma-glycidoxypropyltrimethoxysilane, 108 parts of deionized water and 0.1 part of 60% sulfuric acid were mixed, and reacted at 60° C. for 10 hours. Methanol was removed under reduced pressure, and xylene was added to give a polyorganosiloxane solution (C-f) having a solids content of 50% and a Gardner viscosity (25° C.) of DE. The resulting polyorganosiloxane had a number average molecular weight of about 8,000, and contained 6 silanol groups and 20 epoxy group on an average per molecule.

EXAMPLE 1

Solution (A-1) obtained in Production Example 1 (50 parts by weight as solids), 33.3 parts (20 parts as solids content) of U-van 20E (*1), 60 parts of the resin solution obtained in Production Example 4 (30 parts as solids) and 1 part of Raybo #3 (*2) were mixed and stirred. Then, Swasol 1000 (*3) was added to adjust the mixture to a solution viscosity of 25 seconds (Ford cup 4, 25° C.) The solution was coated and tested as shown below.

(*1) U-van 20SE: (a product of Mitsui Toatsu Chemicals Inc., a butyl etherified melamine resin solution having a solids content of about 60% (tradename)

(*2) Raybo #3: a silicone surface adjusting agent having an effective component of about 1%, tradename.

(*3) Swasol 1000: a petroleum-type aromatic solvent, a tradename for a product of Cosmo Oil Co., Ltd.)

EXAMPLE 2-14 AND COMPARATIVE EXAMPLE 1-3

Example 1 was repeated except that the mixture before the viscosity adjustment was prepared as shown in Table 1. The solution was adjusted to a viscosity corresponding to a Ford cup pf 25° C. of 25 seconds, and coated and tested as shown below.

The proportions shown in Examples and Comparative Examples in Table 1 were shown by the amounts (parts) of solids or effective amounts.

(*4) and (*5) in table 1 were as follows:

(*4) Cymel 303, a product of Mitsui-Cyanamid Ltd., a tradename for hexamethoxymethylolmelamine having a solids content of about 100%.

(*5) Nacure 5225: a solution of a neutralization product of dodecylbenzenesulfonic acid with amine, containing about 25% of an effective component, a tradename of a product of King Industries, Co., Ltd.

Conditions for the Preparation of a Coated Film

In each run, the paint was coated and to heated to prepare a cured film.

An epoxy-type cationic electrodeposition paint was electrodeposited to a dry film thickness of about 20 microns on a dull steel plate having 0.8 mm thickness on which a zinc phosphate treatment was applied. On the baked electrodeposited film, an automobile surface was applied and baked to a dry film thickness of 20 micrometers. The coating was wet-sanded with sandpaper (#400) Then, the coated film was dried and degreased with petroleum benzine.

On the treated material, Magicron Base Coat HM-22 (a metallic paint made by Kansai Paint Co., Ltd.) was applied by means of an air spray gun F5 (supplied by Meiji Machine Co., Ltd.) to a cured thickness of about 15 micrometers. After standing at room temperature for 3 minutes, the paints adjusted in viscosity in Examples 1 to 14 and Comparative Examples 1 to 3 was coated by means of an air spray gun F5 to a cured thickness of 40 micrometers. The coated films were set for about 10 minutes at room temperature. Then, they were heat-cured at 140° C. for 30 minutes in an electric hot dryer. The baked coated plates were each tested. The results are shown in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| OH-containing resin (A) | | | | | | | | | |
| Type | A-1 | A-3 | A-2 | A-1 | A-1 | A-3 | A-2 | A-1 | A-1 |
| Solids (parts) | 50 | 50 | 50 | 50 | 50 | 50 | 50 | 50 | 50 |
| Amino acid (B) (solids, parts) | | | | | | | | | |
| U-van 28SE | 20 | 25 | | 20 | 20 | 25 | | 20 | |
| Cymel 303 (*4) | | | 20 | | | | 20 | | 25 |
| Crosslinkable resin (C) | | | | | | | | | |
| Type | C-a | C-a | C-a | C-b | C-c | C-c | C-c | C-d | C-d |
| Solids (parts) | 30 | 25 | 30 | 30 | 30 | 25 | 30 | 30 | 25 |
| Nacure 5225 (*5) (effective amount, parts) | | | 1 | | | | 1 | | 1 |
| Raybo #3 (effective amount, parts) | 0.01 | 0.01 | 0.01 | 0.01 | 0.01 | 0.01 | 0.01 | 0.01 | 0.01 |
| Test item | | | | | | | | | |
| Film appearance | ◎ | ◎ | ◎ | ◎ | ◎ | ◎ | ◎ | ◎ | ◎ |
| 60° C. gloss | 102 | 102 | 103 | 102 | 103 | 102 | 103 | 102 | 103 |
| Pencil hardness | H | H | H | H | H | H | H | H | H |
| Acid resistance | ◎ | ◎ | ◎ | ◎ | ◎ | ◎ | ◎ | ◎ | ◎ |
| Water resistance | ◎ | ◎ | ◎ | ◎ | ◎ | ◎ | ◎ | ◎ | ◎ |
| Solvent resistance | ○ | ○ | ○ | ○ | ○ | ○ | ○ | ○ | ○ |
| Scratch resistance | ○ | ○ | ◎ | ○ | ○ | ○ | ◎ | ○ | ◎ |
| Gel fraction (%) | 96 | 96 | 97 | 95.5 | 95.5 | 96 | 97 | 95.5 | 97.5 |

| | Examples | | | | | Comparative Examples | | |
|---|---|---|---|---|---|---|---|---|
| | 10 | 11 | 12 | 13 | 14 | 1 | 2 | 3 |
| OH-containing resin (A) | | | | | | | | |
| Type | A-1 | A-3 | A-2 | A-1 | A-1 | A-1 | A-3 | A-2 |
| Solids (parts) | 50 | 50 | 50 | 50 | 45 | 70 | 70 | 70 |
| Amino acid (B) (solids, parts) | | | | | | | | |
| U-van 28SE | 20 | 25 | | 20 | | 30 | 30 | |
| Cymel 303 (*4) | | | 20 | | 25 | | | 30 |
| Crosslinkable resin (C) | | | | | | | | |
| Type | C-e | C-e | C-e | C-f | C-f | — | — | — |
| Solids (parts) | 30 | 25 | 30 | 30 | 30 | — | — | — |
| Nacure 5225 (*5) (effective amount, parts) | | | 1 | | 1 | | | 1 |
| Raybo #3 (effective amount, parts) | 0.01 | 0.01 | 0.01 | 0.01 | 0.01 | 0.01 | 0.01 | 0.01 |
| Test item | | | | | | | | |
| Film appearance | ◎ | ◎ | ◎ | ◎ | ◎ | ◎ | ◎ | ◎ |
| 60° C. gloss | 103 | 103 | 103 | 102 | 104 | 102 | 102 | 103 |
| Pencil hardness | H | H | H | H | H | H | H | H |
| Acid resistance | ◎ | ◎ | ◎ | ◎ | ◎ | X | X | X |
| Water resistance | ◎ | ◎ | ◎ | ◎ | ◎ | Δ | Δ | Δ |

TABLE 1-continued

| | | | | | | | | |
|---|---|---|---|---|---|---|---|---|
| Solvent resistance | ○ | ○ | ○ | ○ | ○ | (Δ) | (Δ) | (Δ) |
| Scratch resistance | ○ | ○ | ◎ | ○ | ◎ | XX | XX | X |
| Gel fraction (%) | 96.5 | 96.5 | 98 | 95.5 | 98.5 | 94 | 94 | 95 |

The testing methods are as shown below.

Film Appearance

The finish of the coated film was evaluated by a glossy feel and a fatness.

◎: very good
(Δ): nearly good
X : poor

60° gloss

The specular reflectance was measured at 60°.

Pencil Hardness

In accordance with JIS K-5400, the pencil scratch values are indicated.

Acid Resistance

The test plate was half-immersed in a 40% solution of sulfuric acid, and left to stand at 50° C. for 5 hours. Then, it was washed with water, and the coated surface was observed, and evaluated on the following standards.

◎: No change occurred
(Δ): No change was noted in the coated surface. But a difference is shown in the boundary between the immersed portion and the non-immersed portion.
X: The coated surface was whitened.

Water Resistance

The test plate was immersed in hot water at 40° C. for 240 hours. It was then washed with water, and the coated surface was observed and evaluated on the following standards.

◎: No change
(Δ): slight loss of gloss

Solvent Resistance

The coated surface was wiped 10 times with gauze impregnated with xylene. The coated surface was then observed, and evaluated on the following standards.

◎: Scarcely any change
(Δ): Marked injury on the coated surface
Δ: The coated surface was swollen, and tended to be whitened.

Scratch Resistance

The test plate was bonded to the roof of an automobile, and the automobile was washed five times with a washing machine. The state of the coated surface of the test plate was observed. The washing machine was "20 FWRC" made by Yasui Industrial Co., Ltd. The standards of evaluation were as follows.

◎: Scarcely any injury was discovered by visual observation. Acceptable.
○: Some scratches were discovered, but to a very slight degree acceptable.
Δ: Scratches were marked by visual observation. Unacceptable.
X: Clear marked scratches were noted by visual observation. Not acceptable.

Gel Fraction

A free clear film sample obtained by baking at 140° C. for 30 minutes was put in a 300-mesh stainless steel container, and extracted by a Soxhlet extractor with a 1:1 mixture of acetone and methanol for 6 hours. The gel fraction was calculated in accordance with the following equation.

$$\text{Gel fraction (\%)} = \frac{\text{(Weight of the sample after extracton)}}{\text{(Weight of the sample before extraction)}} \times 100$$

We claim:

1. A heat-curable resinous coating composition comprising as a binder component (A) 5 to 90% by weight of a hydroxyl-containing resin selected from hydroxyl-containing acrylic resins and hydroxyl-containing polyester resins, (B) 5 to 50% by weight of an amino resin which reacts under heat with the hydroxyl groups of the hydroxyl-containing resin (A) to form a crosslinkage, and (C) 1 to 90% by weight of a crosslinkable and polyorganosiloxanes having a number average molecular weight of at least 500 and containing at least two silanol groups on an average per molecule and optionally containing an epoxy group, said polyoragnosiloxanes being obtained by hydrolyzing and co-condensing a silane represented by the following formula (II)

$$R_x{}^2Si(OR^3)4-x \qquad (II)$$

wherein $R^2$ and $R^3$ are same or different and each represents a monovalent hydrocarbon group having 1 to 13 carbon atoms, and x is 1, 2 or 3, optionally together with an epoxy-containing silane represented by the following formula (III)

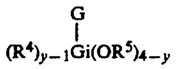

(III)

wherein $R^4$ and $R^5$ are same or different and each represents a monovalent hydrocarbon group having 1 to 13 carbon atoms, y is 1, 2 or 3, and G represents an epoxy-containing organic group, for example an organic group of formula (IV) or (V) below

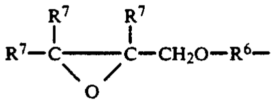

(IV)

-continued

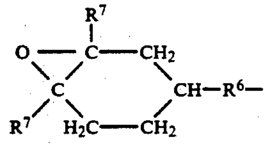

(V)

wherein $R^6$ represents a divalent hydrocarbon group having 1 to 13 carbon atoms, and two or more $R^7$ may be identical or different and each represents a hydrogen atom or a methyl group.

and the coating composition optionally comprising as paint additives, at least one of organic solvents, pigments, ultraviolet absorbers, paint surface adjusting agents, curing catalysts and pigment dispersants.

2. The composition of claim 1 in which the hydroxyl-containing resin (A) is a copolymer of a hydroxyl-containing acrylic monomer and a copolymerizable other vinyl monomer.

3. The composition of claim 2 in which the copolymer has a number average molecular weight of 1,000 to 50,000.

4. The composition of claim 1 in which the hydroxyl-containing resin (A) is an oil-free polyester resin.

5. The composition of claim 4 in which the polyester resin has a number average molecular weight of 800 to 50,000.

6. The composition of claim 2 in which the copolymer contains at least 40% by weight of a $C_1$–$C_{12}$ alkyl acrylate or methacrylate in the constituent monomers.

7. The composition of claim 1 in which the hydroxyl-containing resin (A) has a hydroxyl value of 20 to 200.

8. The composition of claim 1 in which the hydroxyl-containing resin (A) has an acid number of not more than 50.

9. The composition of claim 1 in which the amino resin (B) is a highly etherified melamine resin.

10. The composition of claim 1 in which the polyorganosiloxanes further contain 1 to 10 epoxy groups on an average per molecule.

11. The composition of claim 1 in which the total amount of the silane of formula (II) in which x is 1 and the epoxy-containing silane of formula (III) in which y is 1 is at least 30% by weight based on the weight of the entire silanes used.

12. The composition of claim 11 in which the silane of formula (II) is at least one of methyltrimethoxysilane and phenyltrimethoxysilane.

13. The composition of claim 1 in which the polyorganosiloxanes have a number average molecular weight of 1,000 to 3,000.

14. The coating composition of claim 1 in which the binder component contains 30 to 60% by weight of the hydroxyl-containing resin (A), 10 to 40% by weight of the amino resin (B) and 20 to 40% by weight of the crosslinkable resin (C).

15. The composition of claim 1 in which the crosslinkable resin (C) is a polyorganosiloxane containing 2 to 10 silanol groups on an average per molecule.

* * * * *